Dec. 1, 1931.  A. RINGL  1,834,474
DOUGH SHAPING IMPLEMENT
Filed Dec. 5, 1929  2 Sheets-Sheet 1
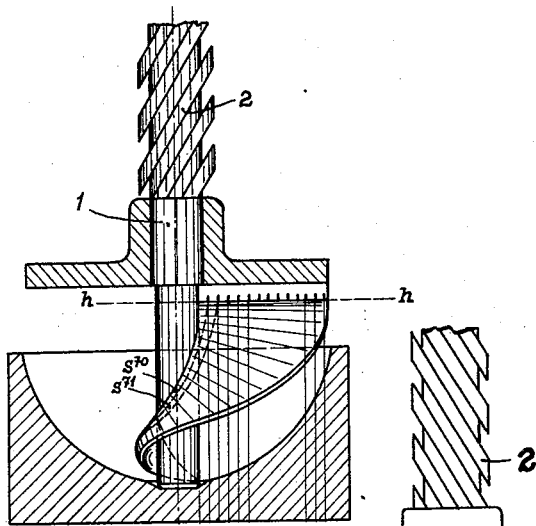
Fig. 1
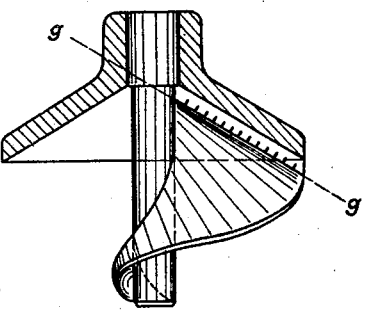
Fig. 3
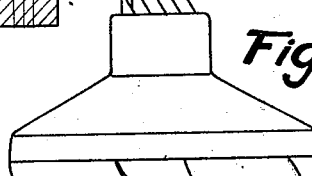
Fig. 8.
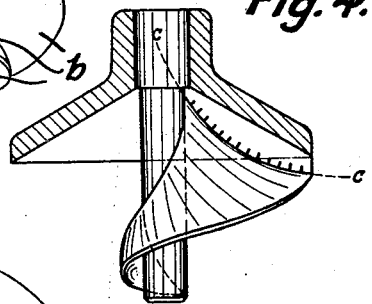
Fig. 4.
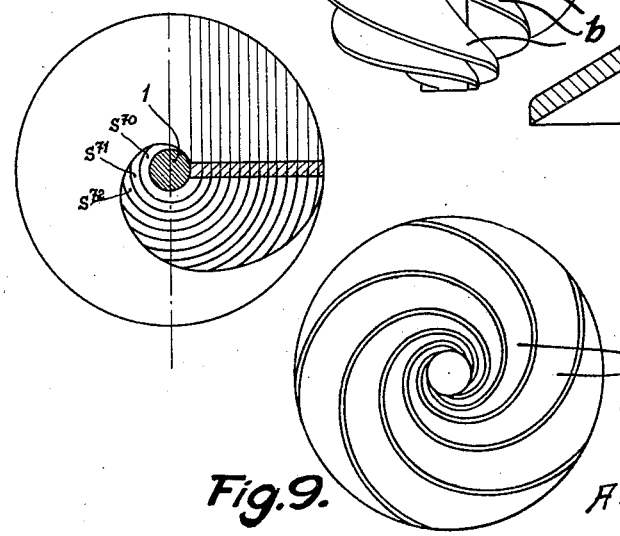
Fig. 2
Fig. 9.
A. Ringl INVENTOR
By Marks & Clerk ATTYS Dec. 1, 1931.  A. RINGL  1,834,474
DOUGH SHAPING IMPLEMENT
Filed Dec. 5, 1929  2 Sheets-Sheet 2
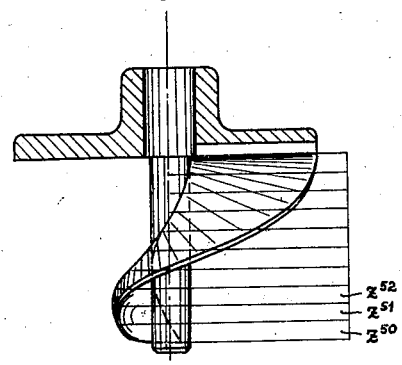
Fig. 5
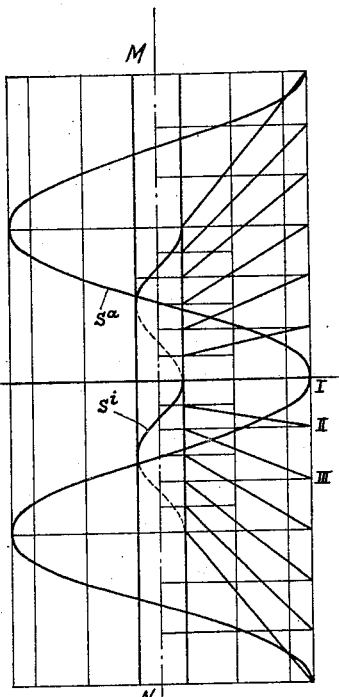
Fig. 7
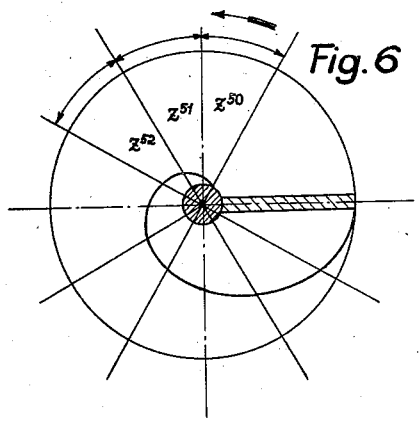
Fig. 6
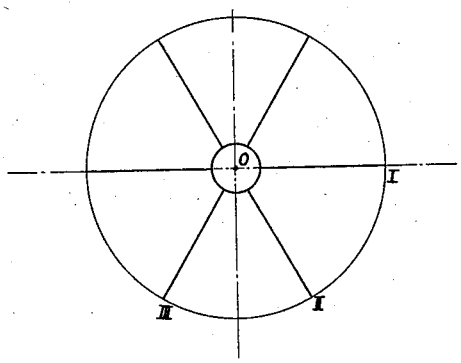
A. Ringl INVENTOR Patented Dec. 1, 1931

1,834,474

UNITED STATES PATENT OFFICE

ALOIS RINGL, OF VIENNA, AUSTRIA

DOUGH SHAPING IMPLEMENT

Application filed December 5, 1929, Serial No. 411,872, and in Austria April 14, 1928.

I have filed applications for this invention in Austria on April 14, 1928; Czechoslovakia on September 7, 1928; and Germany on September 8, 1928.

This invention relates to an improved dough shaping implement for use in connection with machines for shaping rolls and the like.

The essential feature of the dough shaping implement according to the present invention consists in that the operating faces of the shaping blades of the implement are composed of helicoidal surfaced elementary strips with pitches which are gradually increasing at least in one direction.

Some modes of carrying out the present invention are illustrated by way of example on the accompanying sheets of drawings in which—

Fig. 1 shows an implement in sectional elevation, and

Fig. 2 a plan view illustrating the construction of the working blades.

Figs. 3 and 4 show in sectional elevation modified constructions of the implement illustrated in Fig. 1.

Fig. 5 shows a second mode of constructing the implement in sectional elevation, and Fig. 6 is a plan view thereof illustrating the construction of the working blades.

Fig. 7 illustrates by a series of axial sections O—I, O—II, O—III, etc., of the embodiment shown by Figs. 1, 2 the gradually varying inclination of the generatrixes I, II, III, etc., resulting by the said axial section.

Fig. 8 shows the elevation and Fig. 9 the plan view of an implement with five shaping blades.

An infinitely small strip shaped according to a helical line is secured to the shaft 1. The pitch of the said strip is for example seventy millimetres, starts at the horizontal line $h$—$h$ and is designated by the character $s^{70}$ (Figs. 1 and 2). A second infinitely small strip $s^{71}$ is joined to this strip and starts from the same horizontal line. The pitch of the strip $s^{71}$ is for a differential greater than seventy millimetres and so forth. In the plan view (Fig. 2) the individual strips are designated with $s^{70}$, $s^{71}$, $s^{72}$ and so forth in their natural sequence progressing from the shaft towards the periphery of the shaping blade. In view of this continuous sequence of adjoining helicoidal strips (elementary strips) a surface is formed in which the pitches of the individual elementary strips gradually increase from the shaft towards the periphery.

A shaping implement, composed for instance of five shaping blades $b$ (Figs. 8, 9) of the shape just described, which are displaced with respect to one another, is operated in known manner by a screw-shaft 2 of a pitch which does not overstep the smallest pitch of the elementary strips (in the present case seventy millimetres) but preferably is smaller than this value.

In the construction shown in Fig. 3 the individual elementary strips commence along a straight generatrix $g$—$g$, which is inclined with respect to the geometrical axis of the shaft.

Fig. 4 shows a construction in which the initial generatrix $c$—$c$ is inclined with respect to the axis of the shaft and curved.

It is a characteristic feature of all blade-faces formed according to the principle just described, that the inclination of the successive axial sections (whether they are straight or curved lines) towards the axis is continuously varied.

In the implement shown in Figs. 5 and 6, the shaping blades are shaped according to the principle of the pitch which gradually increases in a certain direction but consists of elementary strips $z^{50}$, $z^{51}$, $z^{52}$ which are bounded by two generatrixes, displaced for an angular differential with respect to one another and of a pitch which in an axial direction gradually increases from the lower end of the shaft to the upper end. Thus the pitch of the strip $z^{50}$ is for instance fifty millimetres, that of the strip $z^{51}$ is fifty-one millimetres and so forth. Thereby it is immaterial whether the generatrixes (straight or curved) are normal or inclined with respect to the axis of the implement.

Fig. 7 shows by a series of successive axial sections O—I, O—II, O—III how the inclination of the generatrixes I, II, III, etc.

resulting by the said sections varies continually. The amount of decrease and increase of the inclination against the axis M N of generatrixes drawn from equidistant points on this axis depend on the difference between the pitch of the inner elementary strip $s_i$ and the pitch of the outer elementary strip $s_a$.

Finally it is remarked that, without leaving the scope of the present invention, the two described principles for constructing the operating faces can be combined if desired, e. g. the implement may be provided with operating faces in which the pitch of the individual elementary faces gradually increases in the axial direction, e. g. from the lower to the upper end of the shaft and further in the direction from the shaft towards the periphery of the blades.

Compared with the known constructions of dough shaping implements, the implements with operating faces constructed according to the present invention possesses the following advantages:—

In view of the smaller pitch of the operating face at the shaft, the wall of the shaft 1 will be more encircled by the shaping blade and thus by the dough sheet during the operation of the shaping implement, e. g. in this zone longer dough sheets are formed at the shaft which sufficiently overlap one another in order to provide for a good interconnection.

A further advantage consists in that, in view of the increasing pitch of the shaping blade towards the periphery of the implement, an excessively long dough-sheet cannot be formed in the outer zones, particularly during the return movement of the shaping implement; dough-sheets of this kind would be a drawback owing to the large surface of adhesion.

Finally in view of the increasing pitch of the operating faces of the shaping blade an improved effect is produced particularly in the axial direction in that during the return movement the shaping blades push in front of them or move downward by means of the screw drive the dough in the manner of a feed screw. This effect can be compared with the action of the worm of a meat mincing machine, which feeds forward the meat.

I claim—

1. A dough shaping implement comprising a central shaft having blades arranged around this shaft, operating faces on these blades composed of helicoidal surfaced elementary strips, the pitches of these strips gradually increasing at least in one direction.

2. A dough shaping implement comprising a central shaft having blades arranged around this shaft, operating faces on these blades composed of elementary strips shaped according to helical lines, the pitches of these helical lines gradually increasing from the most inner strip on the shaft to the most outer strip on the periphery of the implement.

3. A dough shaping implement comprising a central shaft having blades arranged around this shaft, operating faces on these blades composed of elementary zones each zone bounded by two generatrixes of a helicoidal surface displaced for an angular differential with respect to one another, the pitches of the helicoidal surfaces containing the succeeding elementary zones increasing gradually from the lower end to the upper end of the shaft.

4. A dough shaping implement comprising a central shaft having blades arranged around this shaft, operating faces on these blades composed of elementary strips shaped according to helical lines, the pitches of these helical lines gradually increasing from the most inner strip on the shaft to the most outer strip on the periphery of the implement and of elementary zones each zone bounded by two generatrixes of a helicoidal surface displaced for an angular differential with respect to one another, the pitches of the helicoidal surfaces containing the succeeding elementary zones increasing gradually from the lower end to the upper end of the shaft.

In testimony whereof I affix my signature.

ING. ALOIS RINGL.